(No Model.)
W. H. VAIL.
CAR STARTER.
No. 350,220. Patented Oct. 5, 1886.
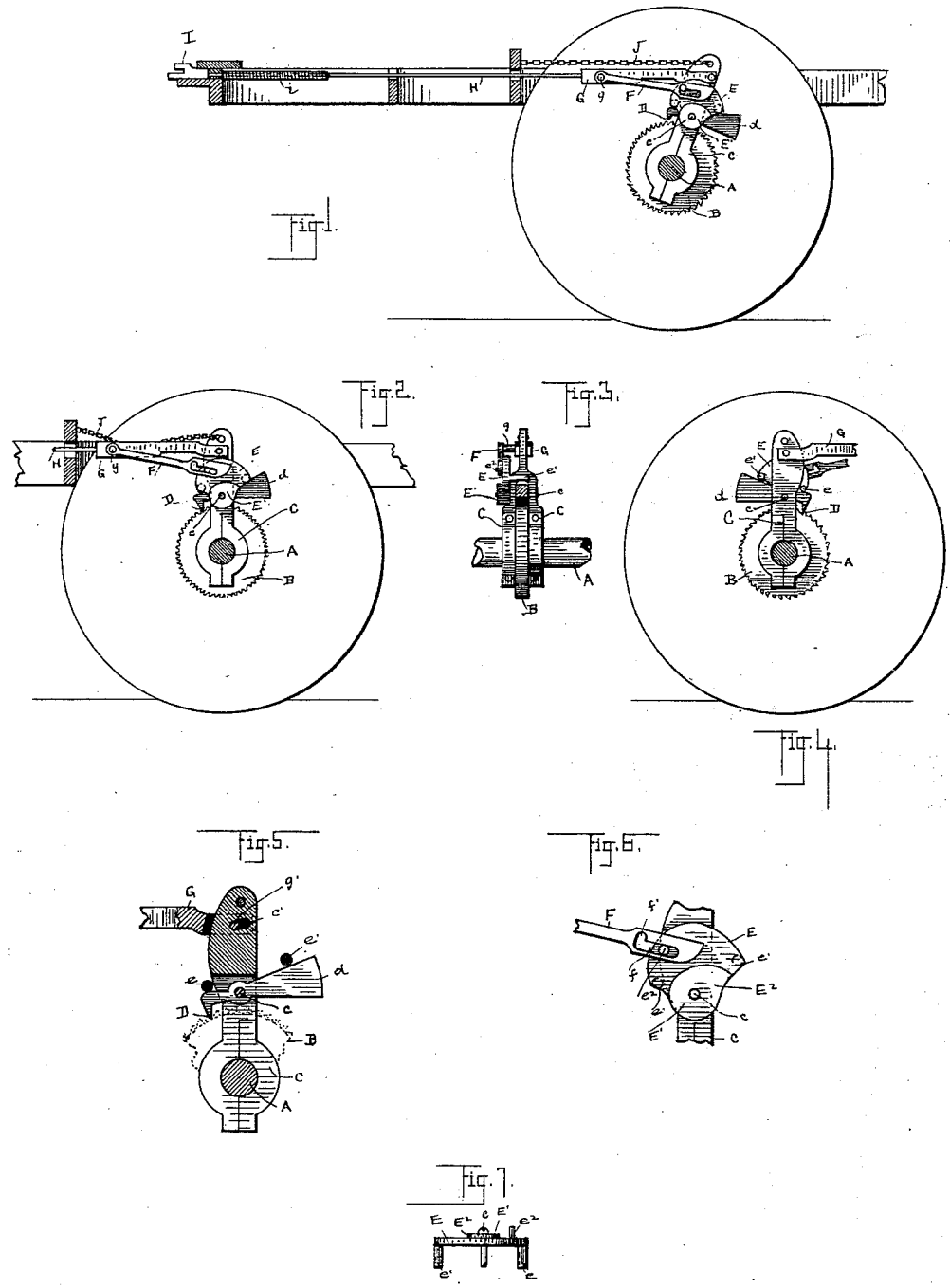
WITNESSES
William H. Vail. INVENTOR
By Leggett & Leggett Attorneys

UNITED STATES PATENT OFFICE.

WILLIAM H. VAIL, OF CLEVELAND, OHIO.

CAR-STARTER.

SPECIFICATION forming part of Letters Patent No. 350,220, dated October 5, 1886.

Application filed March 6, 1886. Serial No. 194,239. (No model.)

*To all whom it may concern:*

Be it known that I, WILLIAM H. VAIL, of Cleveland, in the county of Cuyahoga and State of Ohio, have invented certain new and useful Improvements in Car-Starters; and I do hereby declare the following to be a full, clear, and exact description of the invention, such as will enable others skilled in the art to which it pertains to make and use the same.
My invention relates to improvements in car-starters, designed for street-cars; and it consists in certain features of construction and in combination of parts, hereinafter described, and pointed out in the claims.
In the accompanying drawings, Figure 1 is a side elevation of my improved car-starter in its inoperative position with the car at rest. Fig. 2 is a side elevation showing the car-starter in operative position midway of its throw. Fig. 3 is a rear end elevation. Fig. 4 is an elevation showing the reverse side of the device. Fig. 5 is a section through the center in side elevation. Fig. 6 is an enlarged detail of the tumbler or tilting plate and link for operating the same. Fig. 7 is a plan view of the tilting plate.

A represents a car-axle, on which is rigidly secured the ratchet-wheel B.

C is a forked lever of considerable length, journaled on the axle astride the wheel B.

D is a pawl pivoted between the prongs of the lever C, and is arranged to engage the notches of the wheel B when the top of the lever C is moved in the direction that the car travels. The rear end, $d$, of the pawl serves as a counter-balance, and is somewhat heavier than the forward or engaging end of the pawl.

E is a tumbler or tilting plate that is pivoted to the outside of the lever C by means of a stud, $c$. This plate, the form of which is shown more clearly in Fig. 6, has laterally-projecting pins or lugs $e$ and $e'$ arranged at the respective ends thereof, that extend laterally over and rest upon the pawl D, forward and rearward of the fulcrum of the latter, by which arrangement the tilting plate and pawl must move in unison. The plate E has a laterally-projecting hub, E', the upper surface of which is made eccentric with the axis of the hub, as shown in Fig. 6, the rear portion thereof, E², acting as a cam to elevate the rear end of the link F when the lever C is drawn some distance forward. This link has an elongated opening or slot, $f$, in which operates a pin, $e^2$, the latter extending laterally from the upper portion of the plate E, and located somewhat forward of the center of this plate. The slot $f$, at the forward end thereof, turns upward, as shown in Fig. 6, forming a notch, $f'$, with a square shoulder at the rear of the notch. The link F is pivoted at $g$ to the bar G. The latter is forked at the rear end, and the prongs embrace the upper portion of the lever C. A bolt, $g'$, passes laterally through the prongs of the bar G, and through a slot, $c'$, that runs widthwise of the lever, by reason of which the bar G may be moved endwise a trifle without moving the lever, the bolt of course sliding in the slot. The bar G is connected by a rod, H, with the draw-bar I, the latter having a spring, $i$, to move the draw-bar and bar G rearward. A chain, J, is fastened to the upper end of the lever C and to the car, to limit the rearward motion of the draw-bar and attachments, by which arrangement the bolt $g'$ will be forced by the action of the spring to the rear end of the slot $c'$ whenever there is no forward movement or draft of the draw-bar. The rod H should have a turn-buckle, or some means of adjusting the length thereof, to bring the parts in their proper relative position. When there is no draft on the draw-bar, the parts will be in the position shown in Fig. 1—to wit, the chain will be distended, the bolt $g'$ will be at the rear end of the slot $c'$, the pin $e^2$ will be in the notch $f'$, and the forward end of the pawl will be elevated. With the first forward movement of the draw-bar in starting the car the bolt $g'$ moves along the slot $c'$ without moving the lever C. Meanwhile, by reason of the pin $e^2$ being in the notch $f'$, the plate E is turned forward, causing the pin $e$ to depress the forward end of the pawl and causing the latter to engage the ratchet-wheel, which latter occurs just as the bolt $g'$ reaches the forward end of the slot $c'$, after which the forward movement of the draw-bar turns the lever C forward, and of course causes the pawl to turn the ratchet-wheel and start the car. By the time that the draw-bar has reached the forward end of its stroke the car will have made considerable headway, thus relieving the team of the heavy pull that would otherwise be necessary in starting the car. About midway of the forward movement of the lever C the cam $E^2$ engages and elevates the link F, in consequence of which the pin $e^2$ is released from the notch $f'$, and the pin may slide back in the slot $f$, by reason of which the pin $e$ no longer holds the pawl down, and when the latter no longer moves forward, or when the ratchet-wheel moves faster than the pawl, the latter is snubbed back or thrown out of gear with the ratchet-wheel, after which the counter-balance holds the pawl out of gear.

In stopping the car, as soon as the draft on the draw-bar ceases, the latter is moved rearward by the spring $i$, and the bolt $g'$ slides rearward in the slot $c'$, and as the rear end of the slot is reached the notch $f'$ is brought over the pin $e^2$. Now, as the lever is moved rearward by the draw-bar, the cam $E^2$ is turned from the link F, allowing the latter to fall by gravity, so that the notch $f'$ again engages the pin $e^2$, in which position of parts, when the lever C is at the rear end of its stroke, the pawl is held by the pins $e$ and $e'$ from tilting in either direction, and the entire mechanism is at the starting point, as shown in Fig. 1.

What I claim is—

1. In a car-starter, the combination, with a ratchet-wheel mounted on the car-axle, a lever and pawl for operating the same, a draw-bar connected with the lever, and a spring for moving the draw-bar rearward, of a tilting plate and lugs for controlling the pawl, a link operated from the draw-bar for actuating the tilting plate, a cam for lifting the link and freeing the pawl, and a slot in the lever giving lost motion to the draw-bar, the parts being arranged substantially as set forth.

2. In a car-starter, the combination, with a ratchet-wheel, a forked lever, pawl, and draw-bar, arranged substantially as described, of a slot widthwise of the lever, a pin connected with the draw-bar attachment operating in said slot, giving lost motion to the draw-bar, and a tilting plate pivoted to the pawl-lever and operated from the draw-bar, arranged to engage the pawl with the ratchet-wheel before the pawl-lever is drawn forward, substantially as set forth.

3. In a car-starter, the combination, with a ratchet-wheel, pawl, and lever, a draw-bar for operating the lever, and a slot in the lever to give lost motion to the draw-bar, the parts being arranged substantially as described, of a chain or suitable device, forming a stop to limit the rearward movement of the pawl-lever, substantially as set forth.

4. In a car-starter, the combination, with a ratchet-wheel, pawl, lever, draw-bar, and attachments, arranged substantially as described, of a tilting plate for operating the pawl, a link connected with the draw-bar for operating the tilting plate, the latter having a lug operating in a slot of the link, and a notch connected with the said slot for engaging the lug of the tilting plate, the parts being arranged substantially as set forth.

In testimony whereof I sign this specification, in the presence of two witnesses, this 13th day of February, 1886.

WILLIAM H. VAIL.

Witnesses:
ALBERT E. LYNCH,
GUSTAV ENGEL.